United States Patent
Schoch

(10) Patent No.: US 12,502,399 B2
(45) Date of Patent: Dec. 23, 2025

(54) COMPOSITIONS AND THERAPEUTIC METHODS FOR TREATING CHRONIC SEQUALAE FOLLOWING VIRAL INFECTIONS

(71) Applicant: Jean-Jacques Schoch, Van Nuys, CA (US)

(72) Inventor: Jean-Jacques Schoch, Van Nuys, CA (US)

( * ) Notice: Subject to any disclaimer, the term of this patent is extended or adjusted under 35 U.S.C. 154(b) by 217 days.

(21) Appl. No.: 18/203,640

(22) Filed: May 30, 2023

(65) Prior Publication Data

US 2024/0115590 A1    Apr. 11, 2024

Related U.S. Application Data

(60) Provisional application No. 63/348,002, filed on Jun. 1, 2022.

(51) Int. Cl.

| | |
|---|---|
| A61K 31/706 | (2006.01) |
| A61K 9/00 | (2006.01) |
| A61K 31/09 | (2006.01) |
| A61K 31/12 | (2006.01) |
| A61K 31/198 | (2006.01) |
| A61K 31/352 | (2006.01) |
| A61K 31/409 | (2006.01) |
| A61K 31/675 | (2006.01) |
| A61K 33/08 | (2006.01) |
| A61K 33/30 | (2006.01) |
| A61K 36/068 | (2006.01) |
| A61K 36/07 | (2006.01) |
| A61K 36/074 | (2006.01) |
| A61K 36/185 | (2006.01) |
| A61K 36/19 | (2006.01) |
| A61K 36/23 | (2006.01) |
| A61K 36/258 | (2006.01) |
| A61K 36/28 | (2006.01) |
| A61K 36/48 | (2006.01) |
| A61K 36/481 | (2006.01) |
| A61K 36/52 | (2006.01) |
| A61K 36/71 | (2006.01) |
| A61K 36/81 | (2006.01) |

(52) U.S. Cl.
CPC ......... *A61K 31/706* (2013.01); *A61K 9/0095* (2013.01); *A61K 31/09* (2013.01); *A61K 31/12* (2013.01); *A61K 31/198* (2013.01); *A61K 31/352* (2013.01); *A61K 31/409* (2013.01); *A61K 31/675* (2013.01); *A61K 33/08* (2013.01); *A61K 33/30* (2013.01); *A61K 36/068* (2013.01); *A61K 36/07* (2013.01); *A61K 36/074* (2013.01); *A61K 36/185* (2013.01); *A61K 36/19* (2013.01); *A61K 36/23* (2013.01); *A61K 36/258* (2013.01); *A61K 36/28* (2013.01); *A61K 36/48* (2013.01); *A61K 36/481* (2013.01); *A61K 36/52* (2013.01); *A61K 36/71* (2013.01); *A61K 36/81* (2013.01)

(58) Field of Classification Search
CPC .... A61K 31/706; A61K 9/0095; A61K 31/09; A61K 31/12; A61K 31/198; A61K 31/352; A61K 31/409; A61K 31/675; A61K 33/08; A61K 33/30; A61K 36/068; A61K 36/07; A61K 36/074; A61K 36/185; A61K 36/19; A61K 36/23; A61K 36/258; A61K 36/28; A61K 36/48; A61K 36/481; A61K 36/52; A61K 36/71; A61K 36/81; A61K 31/05; A61K 33/04; A61K 36/9066
See application file for complete search history.

(56) References Cited

U.S. PATENT DOCUMENTS

2024/0115590 A1*    4/2024    Schoch ................. A61K 36/52

OTHER PUBLICATIONS

Trujillo et al.; "Sub-acute and Chronic COVID: Therapeutic Plan for Patients With Post Acute COVID Syndrome (PACS) or Long COVID."; Research Gate (www.researchgate.net/publication/351274265); published Apr. 30, 2021.*
Dr. Rev James; "Improving Recovery Post-COVID: A Functional Medicine Approach"; Hanya: The Art of Living; published Jul. 14, 2021.*
Natalie Jacques; "Long COVID & Post-viral Fatigue"; Raglan Herbal Dispensary; published Apr. 12, 2022.*

* cited by examiner

*Primary Examiner* — Jeffrey T. Palenik
(74) *Attorney, Agent, or Firm* — IPath, PCC; Steven J. Miller

(57) ABSTRACT

Embodiments of therapeutic protocols to treat Post-Acute Sequelae SARS-CoV-2 infection ("PASC"), a.k.a. "long Covid," are described. The PASC treatment protocols focus on a moderating a hyperimmune response; destroying and removing the SARS CoV-2 spike protein from the gut and body, detoxifying the body and the brain; replenishing key nutrients; mitigating depression and anxiety; and a regimen of physical and mental exercises. A standard six-week protocol and a shorter, three-week protocol are disclosed for those with a milder form of PASC are disclosed.

17 Claims, 7 Drawing Sheets

| Purpose | Supplement | Dosing Amount | Treatment Duration | What it does |
|---|---|---|---|---|
| Decrease Hyper Immune Response Reduces inflammation, lowers cold symptoms such as exhaustion, headaches, and pain | Chamomile/Peppermint Tea with Stevia | Two cups per day | 6 weeks | Assists with flu-like chills and hyper-immune response |
| | Red reishi oil / Phyto Spice drops | 3 ml per day | 6 weeks | Reduces cytokines, reduces immune response |
| | Quercetin capsules | 800 mg per day | 6 weeks | Anti-oxidant that also reduces hyper response |
| | Astragalus drops | 850 mg per day | 6 weeks | Anti-inflammatory |
| | Curcumin | 500 mg per day | 6 weeks | Anti-inflammatory |
| | Zinc | 50 mg per day | 6 weeks | Anti-inflammatory & immune support |
| | NAC (N-Acetyl Cysteine) | 600 mg per day | 6 weeks | Antioxidant and anti-inflammatory |
| Eradicate Spike Protein Eliminates spike protein, heals damaged tissues caused by long Covid | Red Dandelion | (dosing) | 6 weeks | (description) |
| | (supplement) | (dosing) | 6 weeks | (description) |
| | Sage Phytospice Blend | (dosing) | 6 weeks | (description) |
| | Yerba mate / Green tea extract | (dosing) | 6 weeks | Reduces spike protein & inflammation, strengthens immune system |
| Detoxify Body & Brain Detox liver and blood (necessary when eliminating viruses and viral fragments) | Zeolite – Powder | 2 – 6 teaspoons per day | 6 weeks | Eliminates toxins and helps eradicate spike protein |
| | EDTA (Calcium Disodium) & Malic Acid | 500 mg – 1000 mg per day | 2 weeks | Chelates remaining heavy metals in body |
| | Desmodium Molkadium drops | 1 ml per day | 6 weeks | Helps detox liver and kidneys |
| | Pimpinella Anisum drops | 1 ml per day | 6 weeks | Helps detox brain and nervous system |
| | Liver Cleanse Complex (Milk thistle, etc.) | 1 capsule per day | 6 weeks | Helps liver process toxins |
| | Nicotinamide Riboside for NAD+ | 300 mg per day | 6 weeks | Critical for raising NAD+ levels |
| | Pterostilbene | 50 mg per day | 6 weeks | Increases effect of Nicotinamide Riboside |
| | Equal IV Potassium-based hydration pack | 1 quart/liter per day | 6 weeks | Rehydrate body with electrolytes |
| Replenish & Heal Body Revitalize body, cell regeneration, strengthen immune system, and replenish depleted nutrients | Miracle* Multivitamin, mineral, etc. | 2 packets per day | 6 weeks | Used to replenish body's nutrients |
| | Panax Ginseng | 500 mg TID extract | 6 weeks | Adaptogen: to increase body core energy |
| | Probiotics | 1 capsule per day | 6 weeks | Used to replenish body's nutrients |
| | Vitamin C | 1000 mg per day | 6 weeks | Used to replenish body's nutrients |
| | Vitamin D | 2000 iu per day | 6 weeks | Used to replenish body's nutrients |
| | Vitamin B Complex | 1 capsule per day | 6 weeks | Used to replenish body's nutrients |
| | Chlorophyll | 5 mg per day | 6 weeks | Used to replenish body's nutrients |
| | Magnesium | 225 mg – 350 mg per day | 6 weeks | Used to replenish body's nutrients |
| | Selenium | 300 mcg per day | 6 weeks | Used to replenish body's nutrients |
| Restore Brain Helps Eliminate Brain Fog, Depression & Anxiety, Regeneration for Neurons | Palatini Mushroom | 5ce – 0.5 – 1.5 grams | 6 weeks | Has been clinically validated for anti-depression & anxiety and now seen in studies for neuron regeneration and muscle available |
| | Lion's Mane Mushroom | 2000 mg per day | 6 weeks | Use daily and also with Psilocybin |
| | Ashwagandha | 200 mg per day | 6 weeks | Also an adaptogen used to rebuild core energy |

FIG. 5

| Schoch Protocol | | Week 1 | Week 2 | Week 3 | Week 4 | Week 5 | Week 6 |
|---|---|---|---|---|---|---|---|
| Eliminate Spike Protein & Symptoms | Deactivate Immune Response | Cistus Incanus tea | 4 cups | 4 cups | 4 cups | 4 cups | 4 cups | 4 cups |
| | | Black seed oil | 2 droppers | 2 droppers | 2 droppers | 2 droppers | 2 droppers | 2 droppers |
| | | Quercetin | 2 capsules | 2 capsules | 2 capsules | 2 capsules | 2 capsules | 2 capsules |
| | | Andrographis | 2 capsules | 2 capsules | 2 capsules | 2 capsules | 2 capsules | 2 capsules |
| | | NAC | 2 capsules | 2 capsules | 2 capsules | 2 capsules | 2 capsules | 2 capsules |
| | | Curcumin | 2 capsules | 2 capsules | 2 capsules | 2 capsules | 2 capsules | 2 capsules |
| | Eradicate Spike Protein | Gum Benzoin | | ½ tsp | 1 tsp | 1 tsp | 1 tsp | |
| | | Black Walnut Hull | | ½ tsp | 1 tsp | 1 tsp | 1 tsp | |
| | | Chaga Mushroom | ½ tsp | ½ tsp | ½ tsp | ½ tsp | ½ tsp | ½ tsp |
| | | Turkey Tail Mushroom | ½ tsp | ½ tsp | ½ tsp | ½ tsp | ½ tsp | ½ tsp |
| | Detoxify Body & Brain | Zeolite | 6 tsp | 2 tsp | 2 tsp | 2 tsp | 2 tsp | 6 tsp |
| | | Burbur & Pinella | 1 dropper | 1 dropper | 2 droppers | 2 droppers | 2 droppers | 1 dropper |
| | | EDTA | | | | | 4 capsules | 4 capsules |
| Heal Body & Brain | Replenish & Heal Body | Nicotinamide Riboside | 300 mg | 300 mg | 300 mg | 300 mg | 300 mg | 300 mg |
| | | Pterostilbene | 100 mg | 100 mg | 100 mg | 100 mg | 100 mg | 100 mg |
| | | Mycovite® nutrients | 2 packets | 2 packets | 2 packets | 2 packets | 2 packets | 2 packets |
| | | Liquid I.V.® | 1 quart | 1 quart | 1 quart | 1 quart | 1 quart | 1 quart |
| | | Panax Ginseng | 2 capsules | 2 capsules | 2 capsules | 2 capsules | 2 capsules | 2 capsules |
| | | Ashwagandha | 2 capsules | 2 capsules | 2 capsules | 2 capsules | 2 capsules | 2 capsules |
| | | Microdose Psilocybin | 3x p/week | 3x p/week | 2x p/week | 2x p/week | 2x p/week | 1x p/week |
| | Heal brain | Lion's Mane | 2 capsules | 2 capsules | 2 capsules | 2 capsules | 2 capsules | 2 capsules |

These show the quantity per day, for each week

Repeat "Week 5" if autoimmune-like symptoms are still present at the end of Week 5

© 2021-2022 Jean-Jacques Schoch

FIG. 6

| For Milder Symptoms | Week 1 | Week 2 | Week 3 |
|---|---|---|---|
| Cistus Incanus tea | 2 cups | 2 cups | 2 cups |
| Quercetin | 2000 mg | 2000 mg | 2000 mg |
| Andrographis | 800 mg | 800 mg | 800 mg |
| Chaga Mushroom | ½ tsp | ½ tsp | ½ tsp |
| Turkey Tail Mushroom | ½ tsp | ½ tsp | ½ tsp |
| Gum Benzoin | ½ tsp | 1 tsp | 1 tsp |
| Black Walnut Hull | ½ tsp | 1 tsp | 1 tsp |
| Zeolite | 6 tsp | 2 tsp | 2 tsp |
| Liver Cleanse Complex | 1 capsule | 1 capsule | 1 capsule |
| Multivitamin & Mineral | 2 packets | 2 packets | 2 packets |
| Panax Ginseng | 1000 mg | 1000 mg | 1000 mg |
| Lion's Mane | 2000 mg | 2000 mg | 2000 mg |
| Ashwagandha | 2600 mg | 2600 mg | 2600 mg |

FIG. 7

COMPOSITIONS AND THERAPEUTIC METHODS FOR TREATING CHRONIC SEQUALAE FOLLOWING VIRAL INFECTIONS

BACKGROUND OF THE INVENTION

Technical Field

The disclosures herein relate to therapeutic methods of treating chronic sequelae of viral infections. Specifically, the disclosed invention relates to compositions and treatment protocols for treating chronic illness following infection with the novel coronavirus SARS-CoV-2 ("Covid.")

State of the Art

"Long Covid" or "Post-Covid Syndrome" is a set of symptoms that vary somewhat between individuals. People who have it are called "Long Haulers." Its clinical name is Post-Acute Sequelae SARS-CoV-2 infection, or PASC. As much as fifty percent of people infected with the SARS-CoV-2 virus (Covid-19) develop PASC. The exact cause of PASC is unknown, however it behaves like an autoimmune-like disease and can be fully disabling. Currently, there are no known cures or effective treatment protocols to facilitate recovery from PASC with full symptom resolution. There is also no known useful understanding of PASC symptoms.

Because of these and other problems, there is a need for compositions and treatment protocols for treatment of PASC that address the aforementioned deficiencies.

BRIEF SUMMARY OF THE INVENTION

The disclosures herein relate to a breakdown of PASC symptom complexes into specific groups based upon causative factors. An outline of novel therapeutic protocols for addressing each symptom complex group is then provided. Compositions useful for treating each symptom complex are discussed. Dosing regimens for a full six (6) week therapeutic protocol are disclosed in detail in the written description and drawing figures and a rationale for each is provided. An abbreviated protocol for treating mild PASC is also disclosed.

The foregoing and other features and advantages of the invention will be apparent to those of ordinary skill in the art from the following more particular description of the invention and the accompanying drawings.

BRIEF DESCRIPTION OF THE DRAWINGS

FIG. 5 is a chart showing details of a six (6) week therapeutic protocol for treating PASC;

FIG. 6 is an illustration showing additional details of a six (6) week protocol for treating PASC; and FIG. 7 is an illustration showing an abbreviated three (3) week protocol for treating mild cases of PASC.

DETAILED DESCRIPTION

Various example embodiments of compositions and treatment protocols for treatment of PASC are disclosed herein. The therapeutic protocols comprise specific regimens to reverse damage caused by PASC and resolves symptoms targeting at least six (6) specific mechanisms of damage occurring in human patients with PASC.

Figure 1:
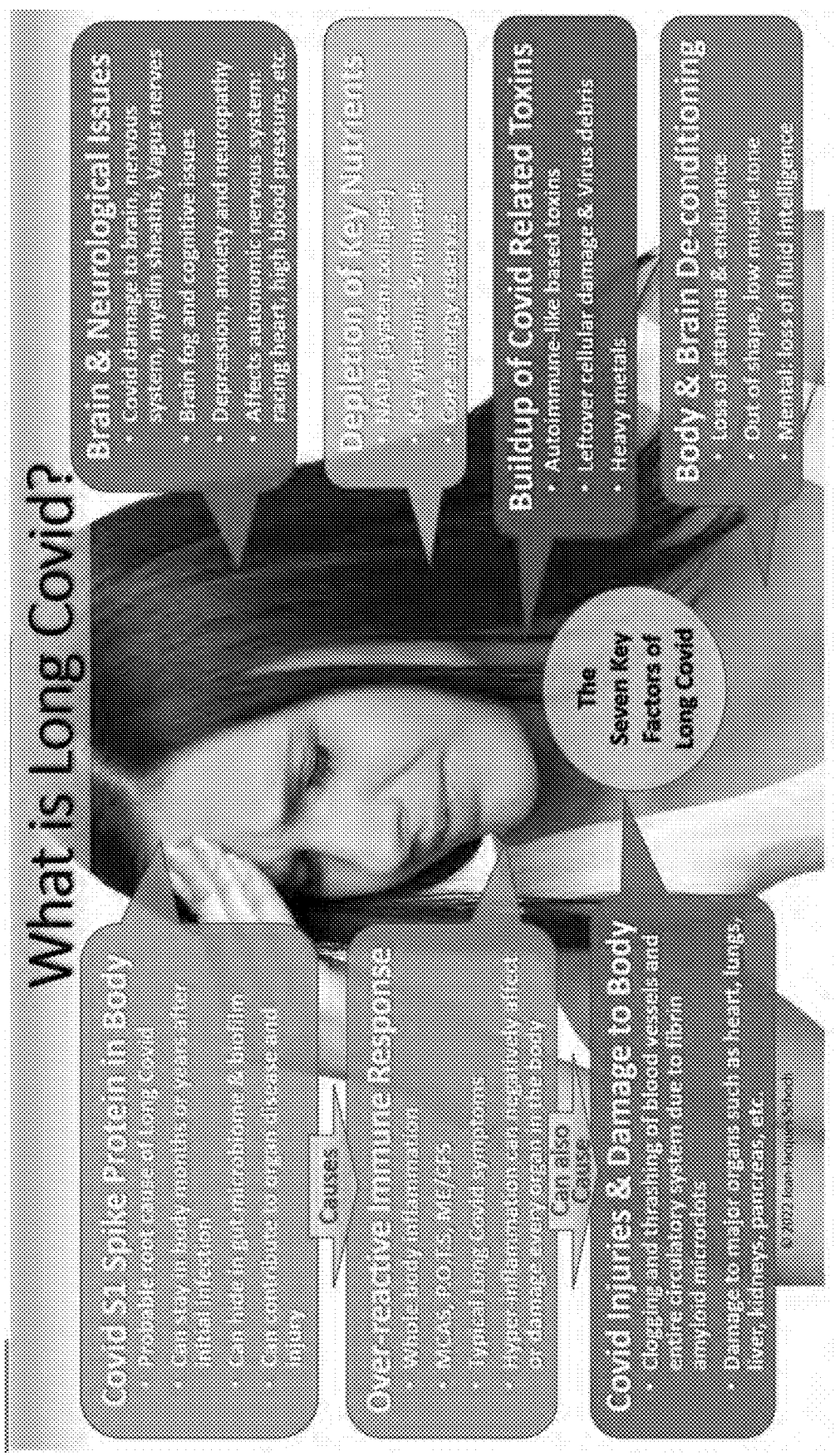
FIG. 1 is an illustration diagramming symptom complex groups of PASC (Long Covid)

FIG. 1 is an illustration diagramming symptom complex groups of PASC (Long Covid). The root cause of PASC is thought to be triggered by a ribonucleic acid ("RNA") remnant of the Covid-19 virus that remains in the body-even 15 months or longer after the initial Covid-19 infection has resolved. According to recent research, traces of the Covid-19 S1 spike protein remains in the body, brain, and gut microbiome post-infection. It is probable that the S1 spike protein triggers the body's immune system to overreact when over-exerting or over-stressed. This releases a storm of cytokines, chemokines, histamines, fractalkines, etc., causing full-body hyper-inflammation and many PASC symptoms.

Online videos, websites, and even a few doctors have recommended the antiparasitic pharmaceutical drugs Ivermectin and Hydroxychloroquine to address PASC. But after more than 18 months of testing and research, there are no peer-reviewed studies that show these drugs by themselves to be any more effective than a placebo in healing PASC.

For Covid related issues, Ivermectin's only value appears to be as a zinc ionophore; in that it helps push zinc into cells to prevent those cells from becoming infected. However, an over-the-counter supplement, Quercetin, is also an effective zinc ionophore, but is completely safe and doesn't ruin the gut microbiome, like Ivermectin does.

It is now believed that a majority of people who were infected with Covid-19 have lingering effects, from loss of taste and smell to severe disability. It is possible that over 50% of people who have had Covid-19 are either completely disabled or unable to fully function in life (work, school). That could mean that up to 25 million Americans and 140 million people worldwide are affected long-term by PASC.

Researchers have also identified three other risk factors that can lead to PASC: (1) the presence of specific autoantibodies that attack the body, (2) Epstein-Barr virus DNA levels in the blood, and (3) pre-existing Type 2 diabetes. As of now, a medical consensus on how to heal people with PASC is lacking. In other words, there is nothing conventional medicine can offer, medically or pharmaceutically, to completely remedy PASC. All a healthcare provider can currently recommend is a low-histamine diet, some antihistamine drugs and steroids, plenty of rest and sleep, and avoiding overexertion and stress.

Therapeutic protocols for healing PASC are set forth in two parts. First, these disclosures organize PASC into seven key symptom complexes and addresses treatment of each symptom complex separately. Breaking down PASC into separate symptom complexes is a key feature of realistic opportunities to heal PASC. Second, after defining the seven key symptom complexes, therapeutic protocols are set forth based upon a holistic, whole-body approach that allows for the discovery of requirements to fully heal PASC. Six specific therapeutic regimens are provided that synergistically address each of these seven key factors, thereby allowing for complete, full-body healing.

PASC Symptoms Result from Seven Key Factors

As shown in FIG. 1, the symptoms of PASC are organized by seven key factors:
(1) Covid S1 Spike Protein remains in the body for weeks, months, or even years beyond the initial infection. This can adversely affect health and cause injury to major bodily organs. The spike protein and possibly other virus remnants remaining in the body are the root cause of PASC.
(2) Over-reactive immune response to the Covid S1 spike protein and possibly other virus remnants causing whole body inflammation, hair loss, brain fog, depression, anxiety, mast cell activation syndrome (MCAS), postural orthostatic tachycardia syndrome (POTS), Myalgic Encephalomyelitis/Chronic Fatigue Syndrome (MF/CFS) and can negatively affect or damage every organ in the body.
(3) Covid-related injuries & damage to major organs, typically manifesting as diseases that are circulatory, neurological, heart, lungs, digestive, diabetic, etc.
(4) Brain and neurological issues, causing depression, anxiety, brain fog, neuropathy, and lost memories. These can also negatively affect the autonomic nervous system contributing to postural orthostatic tachycardia syndrome (POTS).
(5) Depletion of key nutrients, and collapse of the NAD+ (Nicotinamide adenine dinucleotide) system, causing general malaise, exhaustion, slowness to heal, depression, and exacerbating PASC symptoms
(6) Buildup of Covid-related toxins in the body, for example, virus remnant residue, autoimmune-like toxins, leftover cellular damage debris, and heavy metals. These can also cause malaise.
(7) Body and brain de-conditioning, resulting in loss of stamina & endurance, being out of shape with low muscle tone, and mental: loss of fluid intelligence.

Figure 2:
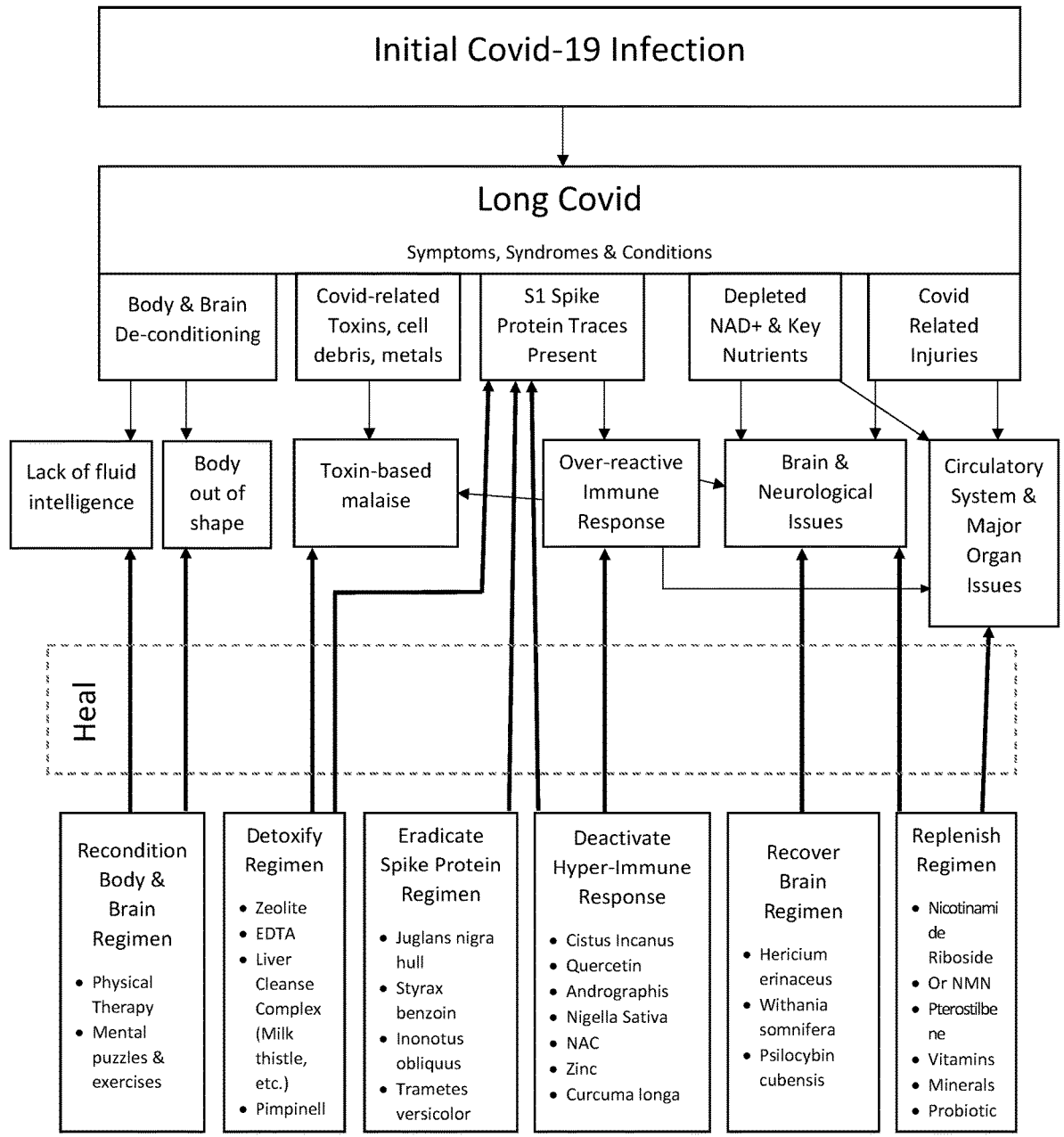
FIG. 2 is a chart correlating causative factors and therapeutic compositions with symptom complex groups of PASC.

FIG. 2 is a chart correlating causative factors and therapeutic compositions with symptom complex groups of PASC. As shown in FIG. 2, seven of these factors are addressed with a combination of therapeutic protocols, leading to a successful full-body recovery from PASC. These protocols together forma a comprehensive and holistic collection of highly researched and tested therapies designed to help heal all seven fundamental factors of PASC. Here is an overview of these protocols:

Protocol 1—Eradicate Spike Protein

Figure 4:
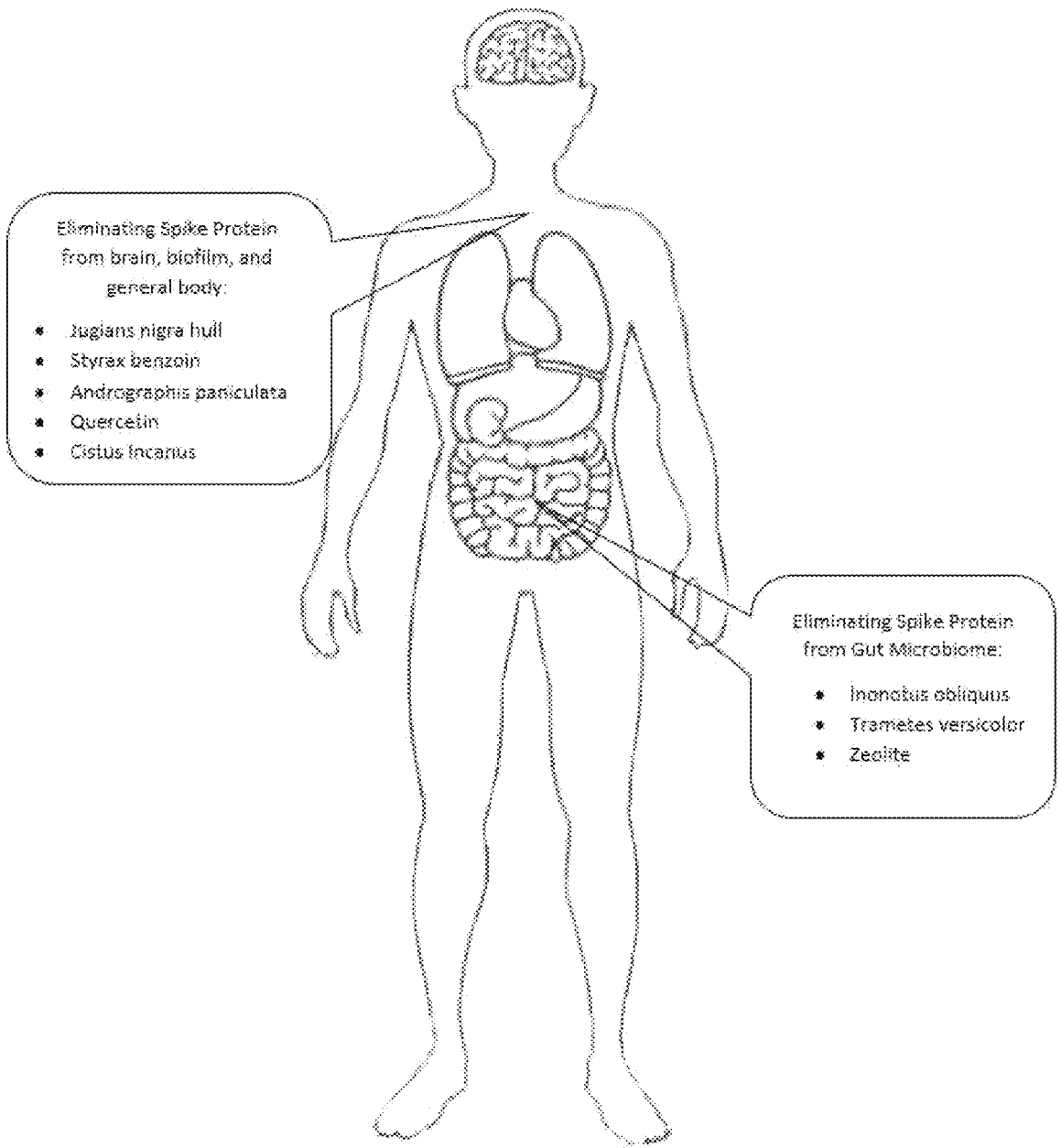
FIG. 4 is an illustration showing therapeutic compositions for eradicating SARS CoV-2, spike proteins, and other virus remnants from the body and gut microbiome.

FIG. 4 is an illustration showing therapeutic compositions for eradicating SARS CoV-2, spike proteins, and other virus remnants from the body. This can include the brain, ovaries, and other sex organs, sinus cavities, gut microbiome, lymphatic system, and other yet unknown body areas. Ridding the gut and body of the SARS CoV-2 S1 spike protein traces and other possible virus remnants that remain in the body post initial covid infection. This is addressed using the following regimen:
1. *Juglans nigra* hull
   i. Works synergistically with *Styrax benzoin* to eradicate the spike protein remnants from the body, by likely "melting" the fatty virus capsid.
2. *Styrax benzoin*
   i. Works synergistically with *Juglans nigra* hull to eradicate the spike protein remnants from the body, by likely "melting" the fatty virus capsid.
   ii. Works to dissolve the biofilms where the spike protein can hide and be protected.
3. *Inonotus obliquus*
   i. Works synergistically with *Trametes versicolor* to adjust the Gut Microbiome in such a way that it causes the spike protein remnants to no longer be able to hide amongst the gut microbiome.
4. *Trametes versicolor*
   i. Works synergistically with *Inonotus obliquus* to adjust the Gut Microbiome in such a way that it causes the spike protein remnants to no longer be able to hide amongst the gut microbiome.
5. Quercetin
   i. Aids in the elimination of the Covid S1 Spike protein by significantly reducing inflammation and oxidants.
6. *Andrographis paniculata*
   i. Has broad-spectrum antiviral properties that both reduce the viral activity and over-reactive immune response, as well as aiding in the eradication of the spike protein remnants.
7. *Cistus incanus*
   i. Has broad-spectrum antiviral properties that aids in the elimination of the SARS CoV-2 S1 spike protein Protocol 2—Deactivate Hyperimmune Response Reducing and/or eliminating the over-reactive immune response to the SARS CoV-2 S1 spike protein and possibly other virus remnants. This is addressed using the following regimen:
1. *Nigella sativa*
   i. Has strong antiviral properties.
   ii. Helps reduce the hyper-inflammation throughout the body.
   iii. Helps eliminate the histamine and cytokine storms ravaging the body (Mast Cell Activation Syndrome) caused by the over-reactive immune response.
2. *Curcuma longa*
   i. Helps reduce the hyper-inflammation throughout the body.
3. N-Acetyl-L-Cysteine (NAC)
   i. Precursor to Glutathione, a powerful antioxidant which helps eliminate the barrage of oxidative debris flooding the body from the autoimmune-like reaction to the spike protein.
4. Quercetin
   i. Helps eliminate the histamine and cytokine storms ravaging the body (Mast Cell Activation Syndrome) caused by the over-reactive immune response.
   ii. Significantly reduces the over-reactive immune response
   iii. A powerful anti-inflammatory that reduces severe inflammation, as well as an antioxidant and analgesic (pain killer)
   iv. Acts as a Zinc ionophore, which helps zinc transfer more easily into cells protecting them from further damage and infection.
5. Zinc
   i. Used to protect cells from damage and infection
6. *Andrographis paniculata*
   i. Has broad-spectrum antiviral properties that both reduce the viral activity and over-reactive immune response, as well as aiding in the elimination of the spike protein remnants.
7. *Cistus incanus*

Protocol 3—Replenish & Heal

Replenishing bodily nutrients and to help heal Covid-related injuries & damage to body and major organs.

1. Nicotinamide Riboside
   i. Helps rebuild the NAD+ (Nicotinamide adenine dinucleotide) system which is critical for cell protection and cell rejuvenation.
   ii. Nicotinamide mononucleotide ("NMN") is a viable alternative to nicotinamide riboside.
2. Pterostilbene
   iii. Powerful antioxidant that also increases the effect of Nicotinamide Riboside or NMN in rebuilding the NAD+ system
3. *Panax quinquefolius*
   i. Increases circulation and vascular function
   ii. Has antioxidation, anti-inflammatory, vasorelaxation, antiallergic, antidiabetic, and anticancer properties.
   iii. An adaptagenic that helps raise the body's depleted core energy levels
4. Probiotics
   i. Helps rebuild the gut microbiome, which is critical for healing and the ultimate removal of the spike protein.
5. Key Vitamins and minerals known to either be depleted by Covid-19, or that aid in the recovery of PASC:
   i. Vitamin C
   ii. Vitamin D
   iii. Vitamin B Complex
   iv. Pantothenic acid (B5)
   v. Chlorophyll
   vi. Magnesium
   vii. Potassium
   viii. Selenium Protocol 4—Recover Brain Healing brain and neurological issues while reducing brain fog, depression, and anxiety with the following regimen:
   1. *Hericium erinaceus*
      i. Has neurogenesis capabilities
      ii. Induces nerve growth factor with Erinacines (cyathin diterpenoids), its bioactive ingredient.
      iii. Creates protection against Ischemic Stroke, Parkinson's Disease, Alzheimer's Disease, dementia
      iv. Reduces depression, neuropathy and neuropathic pain,
   ii. *Withania somnifera*
      i. It has a Cognition Promoting Effect, and reverses memory loss
      ii. Can reverse neurodegenerative diseases such as Parkinson's, Huntington's and Alzheimer's diseases.
      iii. Has a GABA (Gamma-Aminobutyric Acid) like effect and can promote formation of dendrites. (Neurogenesis)
      iv. Reduces stress, increases stamina,
      v. An adaptagenic that helps raise the body's depleted core energy levels
   iii. Psilocybin *cubensis*
      i. Uses neurogenesis capabilities to help rebuild damaged brain neurons, and overall neurological damage
      ii. Uses neuroplasticity capabilities to replace old fear "circuits" to significantly reduce depression, anxiety, and PTSD.

Protocol 5—Detoxify

Detoxifying the body and brain from Covid-related toxins, and toxins released via viral cleanup:
   1. Zeolite clinoptilolite
      i. Performs reversible ion exchange and has a powerful adsorption capacity. Attracts and captures positive-charged debris and remnants, essentially removing metals, virus remnants, cell debris, and leftover oxidants left over from the initial Covid infection, from the intestinal tract and body.
   2. Disodium ethylene diamine tetra-acetic acid
      i. Used for a final chelation of heavy metals
   3. *Pimpinella anisum*
      i. Used to help detox the brain
   4. Liver Cleanse complex:
      i. *Desmodium molliculum*
      ii. Guggulsterones *Commiphora mukul*
      iii. Phosphatidyl Choline
      iv. Sllymarin, Slybum *marianum*
      v. Dandelion Root
      vi. L-Methionine
      vii. *Cynara scolymus*
      viii. *Arctium lappa*
      ix. *Hydrangea* arboresescens
      x. *Achillea millefolium*

Clinical Example

The inventor/applicant, a 63-year-old healthy, active adult male, contracted Covid, which was confirmed by a Covid-19 RT-PCR test on Nov. 29, 2020. Before becoming ill, he walked three miles a day, went to the gym, and bicycled several times a week. He ate a healthy, Mediterranean-based diet. Although he would get the occasional colds with runny nose and sore throat, he hadn't experienced the flu in about 30-plus years. He characterized himself as "a healthy person with a naturally strong immune system."

A few days before Thanksgiving in 2020, before any vaccines were available, his 27-year-old son, who was staying with him during the pandemic, said he was not feeling well and started coughing a bit. Within 2 days, the patent's partner and he were beginning to feel the symptoms of Covid. The all tested positive for the Covid-19 infection. The next nine days he experiences moderately severe symptoms, including chest pain and pressure, massive headaches, random shooting pains body pains, and severe malaise. His partner experienced similar symptoms. The patient further characterized his experience:

Having Covid was difficult. I had never been so physically stressed. At times, it felt like a 300 lb. person was sitting on my chest. My heart was racing. It was difficult to sleep at night with my heart pounding so loud I could hear it in my head. The bad headaches were nonstop and no over-the-counter pain medications would relieve them. I never had a high fever, just a slight temperature of 99.1 and a very light cough. We took it day-by-day. I didn't know if it was going to get worse—or if I was going to have a heart attack.

While ill, he self-medicated with supplements and drugs that were at that time being recommended while going through Covid. These included: Pepcid AC, Zyrtec, melatonin, aspirin, vitamin C, vitamin D, zinc, and quercetin. On the tenth day, he started feeling better and slowly resumed his daily walks over the next week. At first it was a mile and then he increased it to two miles. The only immediate lingering effects he experienced were some memory loss (he couldn't remember his multiplication tables and certain pleasant childhood memories), "feeling down," general body aches, and symptoms of peripheral neuropathy. He is a musician and after Covid he could barely play piano due to what he interpreted as nerve damage in his hands and fingers. He remained optimistic, despite these lingering symptoms. He felt he had not only survived Covid, but it felt like I was going to "get back to [his] normal self."

Roughly two weeks later, however, his symptoms returned. Starting in mid-December, 2020 he again began to feel chest pains while walking outside and a constant headache that would not go away with ibuprofen, acetaminophen, naproxen, or aspirin.

Because of these symptoms, his doctor recommended that he rest, not do any strenuous physical activity, avoid emotional stress—basically do nothing. This worked for a few weeks and he was slowly starting to feel slightly better.

Although he did not feel strong enough to return to work or resume daily exercise, he felt he could organize and clean his home, and similar light chores. These activities seemed to make his symptoms much worse. In some ways, he felt worse than during the active infection. This gradually worsened over the next month. Over the next five months, he reported the following intermittent symptoms (in his words):

Massive migraine-like headaches that nothing would relieve

"Lung Burn" a term PASC sufferers call the weird, intense chest pains

Racing heart—my resting heart rate was 115 BPM (versus normal 65 BPM)

High blood pressure, averaging 141 over 111 (versus normal 117 over 73)

Brain fog—with severely missing memories

Inability to speak—it was extremely difficult to formulate a thought and even harder to try speaking a thought; I often stuttered when I spoke Extreme depression and anxiety Random shooting pains throughout my body, similar to a bee sting Hair loss—clumps of hair would fall out when I showered He felt as though "Covid had turned me from a vibrant, bright, athletic person into a feeble old man, and that alone was an extremely depressing thought." Nine months into suffering PASC, he was feeling so bad, thinking he was going to have a heart attack or stroke that at one point, that his partner drove him to the emergency room at a local hospital. A series of tests, including EKG and a chest x-ray, were all normal, which is often the case with PASC patients. A few weeks later, he followed up the ER visit with an appointment to see his primary doctor. Additional bloodwork was run with normal test results. He continued to feel physically awful, emotionally frustrated, and desperate to find a solution.

Over the next several months, he sought to fully understand his illness and consider possible alternative therapies, learning that:

1. MRIs, X-rays, blood work and lab tests usually show that everything looks normal in Long Covid patients.
2. Many doctors still do not understand Long Covid and often suggest to the patient that they were just imagining the symptoms.
3. Long Covid seems to come in cycles of feeling lousy, then experiencing some good days, and then back to feeling lousy again; over and over again.
4. Deep breathing exercises help reduce headaches and gave me more energy.
5. Acupuncture helped lower my heart rate and blood pressure.
6. Acupressure, Yoga and Qi Dong* have helped many people feel better.
   *Qi Gong is a system of coordinated body-posture and movement, breathing, and meditation used for the purposes of health, spirituality, and martial-arts training.
7. A low-histamine diet has made a big difference in many people with Long Covid (it had no benefit for me, probably due to the "Deactivate Autoimmune-like Reaction" supplements I was already taking as part of the protocol).
8. A multi-vitamin with certain key supplements called Myovite® was helping a lot of people. I tried it and it worked really well for me.

He considered a link between a chronic inflammatory state and the immune response, he considered alternative therapies for Lyme disease:

About 3 weeks into having Long Covid, I got the wild idea that maybe some of the herbal Lyme Disease protocols could help me, so I tried the ones created by Buhner, Zhang, and Cowden. They all seemed to help me feel a little better, but they didn't stop the ongoing relapses and ended up not healing Long Covid. I did end up using some of the individual supplements from these Lyme protocols, specifically *Andrographis, Stevia Rebaudiana, Desmodium Molliculum* (Burbur), and *Pimpinella Anisum* (Pinella). I chose these based on what truly helped me feel better through trial and error on myself.

And wow! After a few days, I could feel a huge difference in my energy levels and a dramatic lessening of my headaches. This tea was truly helping me a lot.

Whenever I would overdo it and feel relapse symptoms creeping back, I would drink extra amounts of the tea. Often, I would drink two to four cups a day depending on how much I felt I needed it.

He did independent research:

I also started reading online medical journals about the effects of Covid and Long Covid on the body. I learned several things, among them:

1. Many PASC patients have similar symptoms to POTS (postural orthostatic tachycardia syndrome). This is where the autonomic nervous system, which controls involuntary functions such as heart rate, blood pressure and vein contractions that assist blood flow, is no longer working correctly. This can cause the body's blood flow to be as low as 50% of normal blood flow, which can cause a racing heart, deep exhaustion, high blood pressure, headaches, brain fog, etc.
2. Covid-19 can ravage and clog up your blood vessels (arteries, capillaries, veins) that cause the heart to have pump much harder due to the added friction of having to push blood through damaged blood vessels that are cut up and thrashed on the inside, and clogged up due to fibrin amyloid microclots. This was one of the reasons for my racing heart. I also learned that the body will naturally heal these damaged blood vessels over time, especially with proper nutrition.
3. Covid-19 is now viewed as a neurological disease, where Covid affects the brain and nerve sheaths of the body. This contributes to the headaches, brain fog, memory loss, etc.
4. Many PASC patients have MCAS (mast cell activation syndrome) symptoms, where Histamine and Cytokine storms are ravaging the body in much the same way an autoimmune disease does. This can cause inflammation of the brain and other organs.
5. Many PASC patients have Vagus Nerve Inflammation, which can affect proper lung function, heart rate, digestion, and much more.

I had Vagus Nerve stimulation therapy for 10 days, but it tended to worsen my headaches, so I stopped it.

6. Having a Covid infection can significantly lower NAD+ levels in the body, especially as you get older. NAD+ (nicotinamide adenine dinucleotide), a coenzyme that is critical in fighting off viruses and having vital energy levels. It's involved in multiple cellular reactions for the generation of energy and maintenance of cellular health, including immune responses to viral infections.

It is now understood that older people have significantly lower NAD+ levels than the younger, which is one of the major reasons seniors had a higher mortality rate when experiencing a Covid-19 infection.

Low NAD+ levels can also significantly slow down the healing process which makes it very difficult for your body and brain to properly heal from all the damage caused by both the initial Covid infection and then PASC.

7. Low NAD+ levels can also lead to chemical-based depression since your body appears to have a more difficult time creating serotonin, a key brain drug that helps keep you happy and stable. After researching NIHs database on NAD+ I learned that there are three types of supplements that can help raise NAD+ levels. From that research, I learned that Nicotinamide Riboside is the most powerful of these supplements; it increases your NAD+ levels faster than anything else, but it's also very expensive. The next most potent one is NMN or Nicotinamide Mononucleotide, which is somewhat less expensive. The slowest but least expensive method of raising your NAD+ levels is with Nicotinic Acid, the niacin that causes flushing (reddening) in the face and body.

I also learned that adding Pterostilbene to the Nicotinamide Riboside significantly increases the concentration of NAD+ levels in the body.

8. Having a Covid infection can deplete key vitamin, chemical and mineral levels in the body, especially Vitamin D, Selenium, and Folate, which slows down the healing process and affects your energy levels.

Following this research, he felt he better understood the etiology of his symptoms:

Now all my symptoms were starting to make sense. Based on this new knowledge, I started to perform research to see if my symptoms were like other known conditions or diseases (such as POTS, MCAS or low NAD+), and to learn what is used to treat these diseases.

I found some research articles on the NIH database about Black Seed Oil and Quercetin (with Zinc) alleviating symptoms of MCAS (mast cell activation syndrome). I ordered both of those online and within a few days of using them, I again noticed an increase in energy and I was having fewer headaches.

I learned that a Chinese herb, *Andrographis* could also help suppress the effects of viruses and pathogens. After trying both, I discovered they likewise contributed to me feeling even better.

I also learned that N-Acetyl-L-Cysteine (NAC) is the most powerful precursor to Glutathione which is the only antioxidant made in the body, and the only antioxidant that science knows works intracellularly. Based on this science I started taking it.

These combined actions led to a substantial decrease in his chronic symptoms, most notably a return of his normal sense of smell and improving energy levels. He increased duration and frequency of mild to moderate exercise, particularly gardening and walking outdoors.

Figure 3:
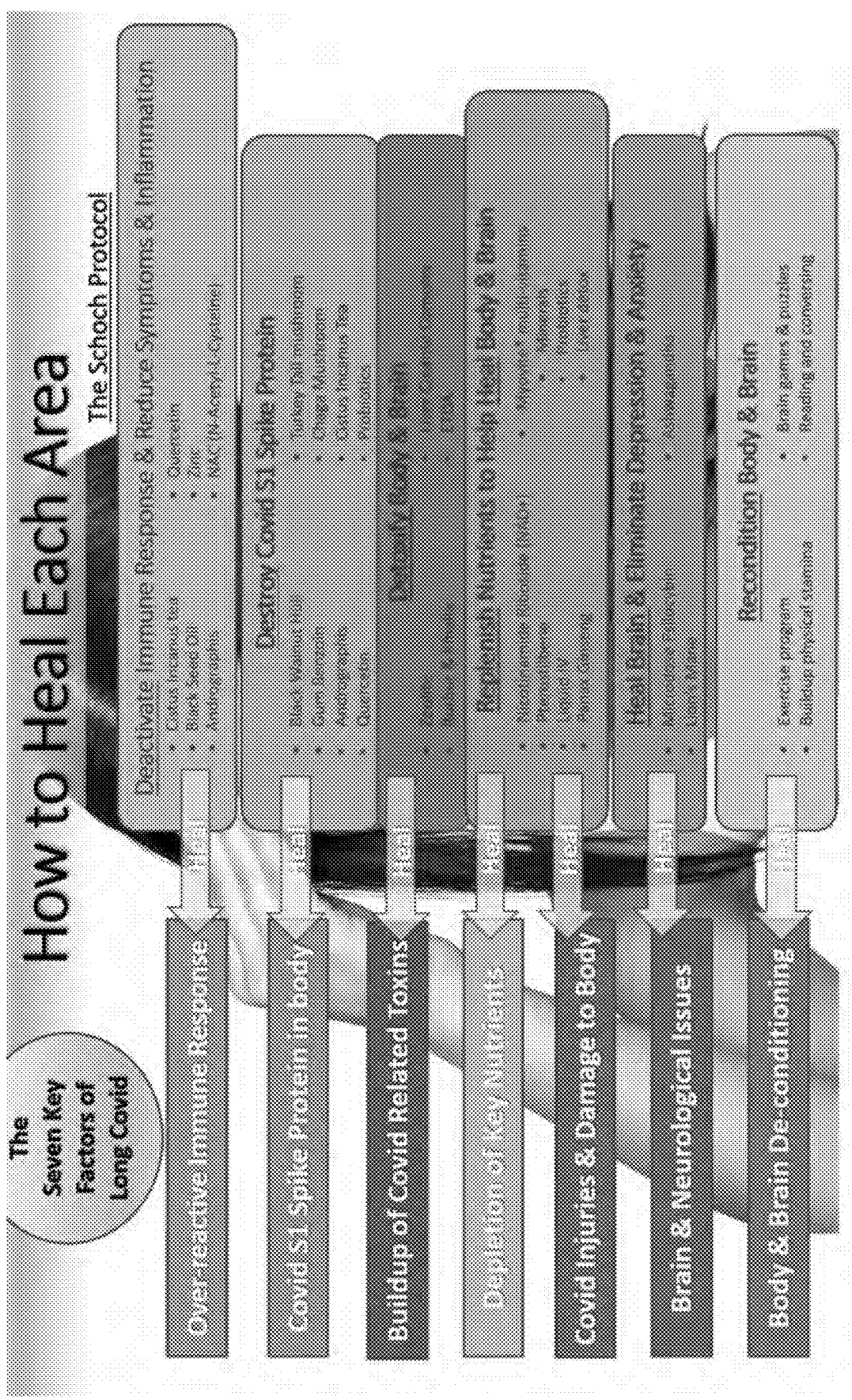
FIG. 3 is an illustration diagramming therapeutic compositions for treating each of the symptom complex groups of PASC.

Accordingly, a therapeutic protocol for treating PASC comprises oral consumption of multiple supplements and active substance for a duration of about six (6) weeks. FIG. 3 is an illustration diagramming therapeutic compositions for treating each of the symptom complex groups of PASC. FIG. 5 is a chart showing details of a six (6) week therapeutic protocol for treating PASC. FIG. 6 is an illustration showing additional details of a six (6) week protocol for treating PASC.

FIG. 7 is an illustration showing an abbreviated three (3) week protocol for treating mild cases of PASC. As shown in FIG. 7, in some embodiments, the therapeutic protocol duration is about three (3) weeks. The shorter, three-week protocol is sufficient for persons with milder symptoms, such as less impact on daily activities, retention of smell and taste, occasional increased fatigability, and frequent (but minor) headaches.

In some embodiments, a six (6)-week therapeutic protocol for treating PASC comprises a mixture of *Cistus incanus* tea, Black Seed oil, *Andrographis*, quercetin, zinc (via Myovite®), and N-Acetyl-L-Cysteine (NAC).

In some embodiments, a therapeutic protocol for treating PASC comprises NAC and Ashwagandha. In some embodiments, the NAC is greater than about 1,000 milligrams (mg). In some embodiments, the Ashwaganda is greater than about 1,300 mg. In some embodiments, a therapeutic protocol for treating PASC comprises Nicotinamide Riboside (or NMN), to rebuild NAD+ levels, Pterostilbene, Liquid I.V.® to fully rehydrate and raise electrolyte (particularly, potassium) levels, *Panax Ginseng*, a probiotic, Vitamin C, and Vitamin D.

In some embodiments, a therapeutic protocol for treating PASC comprises altering the gut microbiome by ingestion of Turkey Tail mushrooms (*Trametes versicolor*) and Chaga Mushrooms (*Inonotus obliquus*).

In some embodiments, a therapeutic protocol for treating PASC comprises blunting the chronic immune response by ingestion of *Andrographis*, Quercetin and *Cistus Incanus* water-based infusion ("tea").

In some embodiments, a therapeutic protocol for treating PASC comprises daily oral consumption of a mixture of different mushrooms, including *Reishi, Shiitake*, and Maritake genera.

In some embodiments, a therapeutic protocol for treating PASC is used in a method to treat chronic symptoms following or during infection with a Herpesvirus. In some embodiments, the Herpesvirus is an Epstein-Barr virus.

In some embodiments, a six-week therapeutic protocol for treating PASC comprises a treatment to moderate a hyperimmune response; a treatment to destroy SARS CoV-2 spike protein, a treatment to detoxify the body and the brain; a treatment to replenish key nutrients; a treatment to mitigate depression and anxiety; and a regimen of physical and mental exercises.

The treatment to moderate the hyperimmune response, in some embodiments, comprises oral administration of a composition of *Cistus Incanus* tea, *Andrographis*, Black Seed Oil, Quercetin, n-acetyl cystine ("NAC"), and Zinc. In some embodiments, the treatment additionally includes Quercetin.

The treatment to destroy SARS CoV-2 spike protein, in some embodiments, comprises initial oral administration of Chaga and Turkey Tail mushrooms in a combination with *Cistus incanus, Andrographis*, and Quercetin. In some embodiments, the treatment additionally comprises oral administration of Gum *Benzoin* and Black Walnut Hull following a period of treatment with the Chaga and Turkey Tail mushrooms, *Cistus incanus, Andrographis*, and Quercetin. In some embodiments, the treatment comprises daily administration of Turkey Tail and Chaga mushrooms for seven (7) days, followed by addition of half-doses of Gum *Benzoin* and Black Walnut Hull for an additional seven (7)

days, followed by adding a dose of NAC and increasing the half-doses to full doses for an additional period of twenty-one (21) days.

The treatment to detoxify the body and the brain, in some embodiments, comprises oral administration of Burbur, *Pinella*, Zeolite, EDTA and a proprietary liver cleanse multivitamin complex (i.e., Myovite®) for about fourteen (14) days. Additional details of this treatment include with the Zeolite, start on a strong triple dose of two teaspoons, three times a day. Take this large amount of Zeolite for just one week so it can do a major body cleanup in the beginning and help mop up whatever heavy metals, loose virus remnants and any other debris remain from the original Covid damage. This larger amount of Zeolite will also work in partnership with the Chaga and Turkey Tail mushrooms to help clean-out the spike protein in the gut. In some embodiments, the treatment comprises reducing the Zeolite to just two teaspoons/day, after two weeks, for a period of four weeks.

Starting about week five, start taking EDTA for the final two weeks to help chelate any heavy metals still in your system as part of the final cleanup. By week six, increase the Zeolite to six teaspoons per day to help mop up any remaining residue from the virus cleanup. In some embodiments, the treatment additional comprises oral administration of Zeolite about once every two weeks.

The treatment to replenish key nutrients, in some embodiments, comprises oral administration of Myovite®, nicotinamide riboside (or NMN) and pterostilbene (for NAD+), *Ginseng*, Ashwagandha and Liquid I.V.®. During inflammation and symptom reduction, you can start to rebuild and heal the injured areas and restore depleted vitamins, minerals, and other vital nutrients that Covid leaches from the body during the original infection. Additionally, adding collagen peptides, fish oil, and creatine and the proprietary vitamin supplement is helpful to speed up healing. If you're over the age of 50, adding 50 mg of DHEA to boost hormone levels can potentially help the body heal faster. In some embodiments, this treatment is continued for at least a full six (6) weeks. In some embodiments, this treatment can be continued indefinitely to improve a feeling of physical well-being.

The treatment to mitigate depression and anxiety, in some embodiments, comprises Psilocybin micro-doses with Lion's Mane and niacin, and Ashwagandha. Part of the healing process is giving your brain and central nervous system the neurogenesis and neuroplasticity tools it needs to repair the neurological damage caused by Covid. In some embodiments, the treatment comprises an initial course of oral micro-dosing Psilocybin for five consecutive days for the first two weeks. A noticeable improvement in brain function typically results. The Psilocybin dose frequency is then reduced to twice a week starting on week three. On week six, the dose frequency is reduced to once weekly. In some embodiments, the Psilocybin micro-dosing is continued for an additional three (3) days following four (4) days with no Psilocybin micro-dosing. In some embodiments, the additional of a daily meditation practice, for about fifteen (15) to twenty (20) minutes, is added to the Psilocybin micro-dosing.

The regimen of physical and mental exercises, in some embodiments, comprises going on very short walks; 100 feet the first few days, then increasing the distance slowly as tolerated to eventually walking at least one mile daily. Working the arms with light weights is additionally useful. Five-to-fifteen-pound weights are sufficient.

In the final weeks, once the spike protein and over-reactive immune response of PASC are cleared out of the system and resolved, a final cleanup and detoxification combined with deeper reconditioning the body and brain and rebuilding the body's core energy reserves is useful.

Additional dietary supplements are helpful following the completion of all treatments and protocols. These additional supplements include Amazing Grass Greens Blend Superfood™ that is added to a daily shake. This Green powder is nutritious but its best to have alongside live greens (romaine, spinach, spring mix, microgreens, raw celery, etc.). Daily supplements additionally include Fish Oil capsules, DHEA, creatine powder, Vital Proteins Collagen Peptides™, Living Silica Collagen Booster™, and NAC. Additional daily supplements may include Nattokinase and French maritime pine bark extract. A diet low in histamine may be helpful in some individuals.

Some foods help diminish symptoms of PASC, including protein shakes with a half-cup of mixed berries and a half a frozen banana; leafy green salads with tomatoes, scallions, radishes, avocado, olive oil and apple cider vinegar; salmon and other seafood; poultry such as chicken and turkey; fruits such as apples, cherries, raspberries blackberries, and bananas; and vegetables, such as cauliflower, broccoli, and most other vegetables.

Some foods may worsen symptoms of PASC, including processed foods with added sugar, foods high in simple carbohydrates such as breads and pastries; alcohol of any kind, and fried foods. Any foods that raise histamine levels may worsen symptoms of PASC, including: vinegar; tomato ketchup; tomatoes; eggplant; spinach; frozen/salted/canned fish (i.e., sardines and tuna); fermented dairy products including cheese yogurt, sour cream, buttermilk, and kefir; fermented vegetables, such as sauerkraut and kimchi; pickles or pickled vegetables; kombucha; cured or fermented meats (i.e., sausages, salami, and fermented ham; wine, beer, champagne, and other alcohol products; fermented soy products, i.e. tempeh, miso, soy sauce; and fermented grains, such as sourdough bread.

In some embodiments, a therapeutic protocol for treating PASC includes consumption of sleep aids, such as California Poppy & Valerian root extract blend; cannabidiol ("CBD"), cannabinol ("CBN"), and *Cannabis* edibles; melatonin; and Benadryl.

Additional adjuncts to therapeutic protocols for treating PASC may include daily meditation, such as for between about twenty (20) and about forty (40) minutes; daily light exercise; stress avoidance; increased consumption of fluids, including at least about sixty-four (64) ounces of water daily and between two and four coups of *Cistus incanus* tea; Epsom salts baths three or four times weekly; acupuncture; and earthing/grounding.

PASC is a complex disease that affects multiple areas of the body and affects them in very different ways, therefore the therapeutic protocols disclosed herein are necessarily detailed and require ingestion of multiple natural substances. To address all of these complexities, the protocols require a broad spectrum of therapies, so following it effectively requires a certain fastidiousness. There are a lot of different ingredients and careful attention to dosing and timing is required.

In some embodiments, the therapeutic protocols disclosed herein may be condenses into a simple course of compressed tablets comprising the aforementioned active agents, which are taken orally Embodiments of therapeutic protocols to treat PASC have been described herein. The PASC treatment protocols focus on a treatment to moderate a hyperimmune response; a treatment to destroy and remove the SARS CoV-2 spike protein from the gut and body, a treatment to detoxify the body and the brain; a treatment to replenish key nutrients; a treatment to mitigate depression and anxiety; and a regimen of physical and mental exercises. A shorter, three-week protocol is also disclosed for those with a milder form of PASC.

The embodiments and examples set forth herein were presented in order to best explain the present invention and its practical application, and to thereby enable those of ordinary skill in the art to make and use the invention. However, those of ordinary skill in the art will recognize that the foregoing description and examples have been presented for the purpose of illustration and example. The description as set forth is not intended to be exhaustive or to limit the invention to the precise form disclosed. Many modifications and variations are possible, in light of the teachings herein above.

What is claimed is:

1. A method for treating post-Covid syndrome comprising:
   administering a first compositional blend comprising (i) an infusion (tea) of *Cistus incanus*, (ii) quercetin, (iii) *Andrographis paniculata*, (iv) nicotinamide mononucleotide, and (v) curcumin;
   administering a second composition comprising gum *benzoin*, *Jugulans nigra* hull, *Inonotus obliquus*, and *Trametes versicolor*;
   administering a third composition comprising zeolite, *Desmodium molliculum*, and *Pimpinella anisum*;
   administering a fourth composition comprising nicotinamide riboside, pterostilbene, *Panax quinquefolius*, and *Withania somnifera*; and
   administering a fifth composition comprising psilocybin and *Hericium erinaceus*.

2. The method of claim 1, wherein the first composition, the second composition, the third composition, and fourth composition, and the fifth composition are administered daily for three (3) consecutive weeks.

3. The method of claim 1, wherein the first composition, the second composition, the third composition, and fourth composition, and the fifth composition are administered daily for six (6) consecutive weeks.

4. The method of claim 1, wherein the first composition additionally comprises zinc.

5. The method of claim 1, wherein the first composition additionally comprises *Nigella sativa*.

6. The method of claim 1, wherein the quantity of quercetin is 1,600 milligrams.

7. The method of claim 1, wherein the second composition additionally comprises ethylenediaminetetraaceitic acid (EDTA).

8. The method of claim 1, wherein the third composition additionally comprises *Silybum marianum*.

9. The method of claim 1, wherein the fourth composition additionally comprises a multivitamin blend having at least three of the vitamins and minerals selected from the group of vitamins and minerals consisting of Vitamin C, Vitamin D, Vitamin B complex, magnesium, selenium, and mixtures thereof.

10. The method of claim 8, wherein the fourth composition additionally comprises chlorophyll.

11. The method of claim 1, wherein the quantity of nicotinamide riboside is 300 milligrams.

12. The method of claim 1, wherein the quantity of pterostilbene is 100 milligrams.

13. The method of claim 1, additionally comprising administration of a sixth composition comprising *Astragalus membranaceous* and *Cordyceps sinensis*.

14. The method of claim 2, wherein the quantity of quercetin is 2,000 milligrams.

15. The method of claim 2, wherein the quantity of *Andrographis paniculata* is 2,000 milligrams.

16. The method of claim 2, wherein the quantity of *Hericium erinaceus* is 2,000 milligrams.

17. The method of claim 2, wherein the quantity of *Withania somnifera* is 2,600 milligrams.

* * * * *